(12) United States Patent
Lu

(10) Patent No.: US 7,170,493 B2
(45) Date of Patent: Jan. 30, 2007

(54) THIRD AXIS INPUT DEVICE FOR MOUSE

(75) Inventor: Shu-Feng Lu, Taipei (TW)

(73) Assignee: Optindex Co., Ltd., Taipei (TW)

( * ) Notice: Subject to any disclaimer, the term of this patent is extended or adjusted under 35 U.S.C. 154(b) by 478 days.

(21) Appl. No.: 10/718,710

(22) Filed: Nov. 24, 2003

(65) Prior Publication Data

US 2005/0110757 A1  May 26, 2005

(30) Foreign Application Priority Data

Oct. 19, 2003  (TW) .............................. 92128962 A

(51) Int. Cl.
  *G09G 5/08*  (2006.01)
(52) U.S. Cl. ...................... 345/163; 345/156; 361/686
(58) Field of Classification Search ........ 345/156–157, 345/160, 163, 164–167, 184; D14/100, 114
  See application file for complete search history.

(56) References Cited

U.S. PATENT DOCUMENTS 6,188,393 B1 *  2/2001  Shu ............................ 345/184

6,285,355 B1 *  9/2001  Chang ........................ 345/163

FOREIGN PATENT DOCUMENTS

GB   2321692 A  *  8/1998

* cited by examiner

*Primary Examiner*—Duc Q Dinh
(74) *Attorney, Agent, or Firm*—Rosenberg, Klein & Lee

(57) ABSTRACT

A third input device used in a mouse is constructed to have a wheel holder mounted on a bottom board inside the mouse, a roller, the roller having a closed outer side, an inner side, and a receiving open chamber in the inner side, an encoding wheel mounted inside the roller and pivoted with the roller to the wheel holder, the encoding wheel having a mechanical tooth form, and a locating plate coupled to the inner side of the roller for enabling the roller to be pivoted with the encoding wheel to the wheel holder, the locating plate holding a plurality of probes respectively disposed in contact with the tooth form of the encoding wheel and adapted to output a signal indicative of direction and amount of rotation of the encoding wheel and the roller.

19 Claims, 12 Drawing Sheets

THIRD AXIS INPUT DEVICE FOR MOUSE

BACKGROUND OF THE INVENTION

1. Field of the Invention

The present invention relates generally to a mouse for data input and, more specifically, to a third axis input device for a mouse, which combines the parts of a mechanical encoding module and a wheel to form a single module.

2. Description of the Related Art

A conventional mouse comprises an X-axis encoder and a Y-axis encoder for output serial logic signals (for example, 11,10,00,01). Moving the mouse on a flat surface in a specific direction causes relative movement of the data to be processed on the screen of the monitor. Basically, using the mouse to move the position of the data on the screen causes the X-axis encoder and the Y-axis encoder to produce a spot displacement on a plane.

Further, some mice have a third axis input device adapted to control web page scrolling. FIGS. 1–3 show a third axis input device according to the prior art. As illustrated, the third axis input device 60 comprises a hollow wheel holder 61 provided at the bottom board 81 inside the mouse 80, and an encoder module fastened pivotally with the wheel holder 61. The encoder module comprises a plastic wheel 70 with a roller 62 fastened to the hollow center of the plastic wheel 70. The roller 62 has a receiving chamber 63 in one side with a cover shell 67 covering the receiving chamber 63. The cover shell 67 has a retaining flange 68 fastened to the wheel holder 61. A barrel 64 is fixedly mounted in the receiving chamber 63, the barrel 64 having transverse light-guide teeth 65 arranged in parallel around the periphery. A circuit board 66 is fastened to the cover shell 67 and disposed inside the receiving chamber 63, and an infrared transceiver unit 69 is installed in the circuit board 66. The infrared transceiver unit 69 comprises an infrared transmitter 691 adapted to emit infrared light onto the inside wall of the barrel 64. An infrared receiver 692 is adapted to receive infrared light emitted from the infrared transmitter 691 and is guided by the transverse light-guide teeth 65 and to further produce different serial phase signals.

According to the aforesaid third axis input device 60, the barrel 64 is rotated with the roller 62 to encode infrared light into serial phase signals. This design is functional; however, because the third axis input device 60 is comprised of a number of parts, its manufacturing cost is high.

FIG. 4 shows another design of third axis input device for mouse. According to this design, the third axis input device comprises a wheel holder 90 mounted on the bottom board 81 of the mouse 80, a wheel 91 pivoted to the wheel holder 90, and a mechanical encoder module 93 provided at one end of the wheel shaft 92 of the wheel 91. The manufacturing cost of this design of third axis input device is relatively lower than the third axis input device shown in FIGS. 1–3. However, because the wheel 91 and the mechanical encoder module 93 must be separately prepared and installed, this design of third axis input device requires a relatively longer manufacturing time.

Therefore, it is desirable to provide a third axis input device that eliminates the drawbacks of the aforesaid prior art designs.

SUMMARY OF THE INVENTION

The present invention has been accomplished under the circumstances in view. The main object of the present invention is to provide a third axis input device that is easy to operate and inexpensive to manufacture. Another object of the present invention to provide a third axis input device that combines the parts of a mechanical encoding module and a wheel to form a single module.

According to one embodiment of the present invention, the third input device is used in a mouse and comprises a wheel holder mounted on a bottom board inside the mouse and a roller. The roller has a closed outer side, an inner side, and a receiving open chamber in the inner side. An encoding wheel is mounted inside the roller and pivoted with the roller to the wheel holder, the encoding wheel having a mechanical tooth form A locating plate is coupled to the inner side of the roller for enabling the roller to be pivoted with the encoding wheel to the wheel holder, the locating plate holding a plurality of probes respectively disposed in contact with the tooth form of the encoding wheel and adapted to output a signal indicative of direction and amount of rotation of the encoding wheel and the roller. The encoding wheel has radial teeth equiangularly spaced around the periphery, and peripheral notches equiangularly spaced around the periphery and equally separated from one another by the radial teeth. The probes can be metal springs or metal conductor members.

According to an alternate form of the present invention, the third axis input device comprises a wheel holder mounted on a bottom board inside the mouse and a roller, the roller having an outer closed side and a receiving open chamber in an inner side thereof At least one probe wheel has a plurality of probes. A locating plate is coupled to the inner side of the roller to pivot the roller and the at least one probe wheel to the wheel holder, the locating plate holding a fixed encoding wheel in contact with the probes of the probe wheel for outputting a signal indicated of the direction and amount of rotation of the roller and the at least one probe wheel relative to the wheel holder.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE INVENTION

Figure 1:
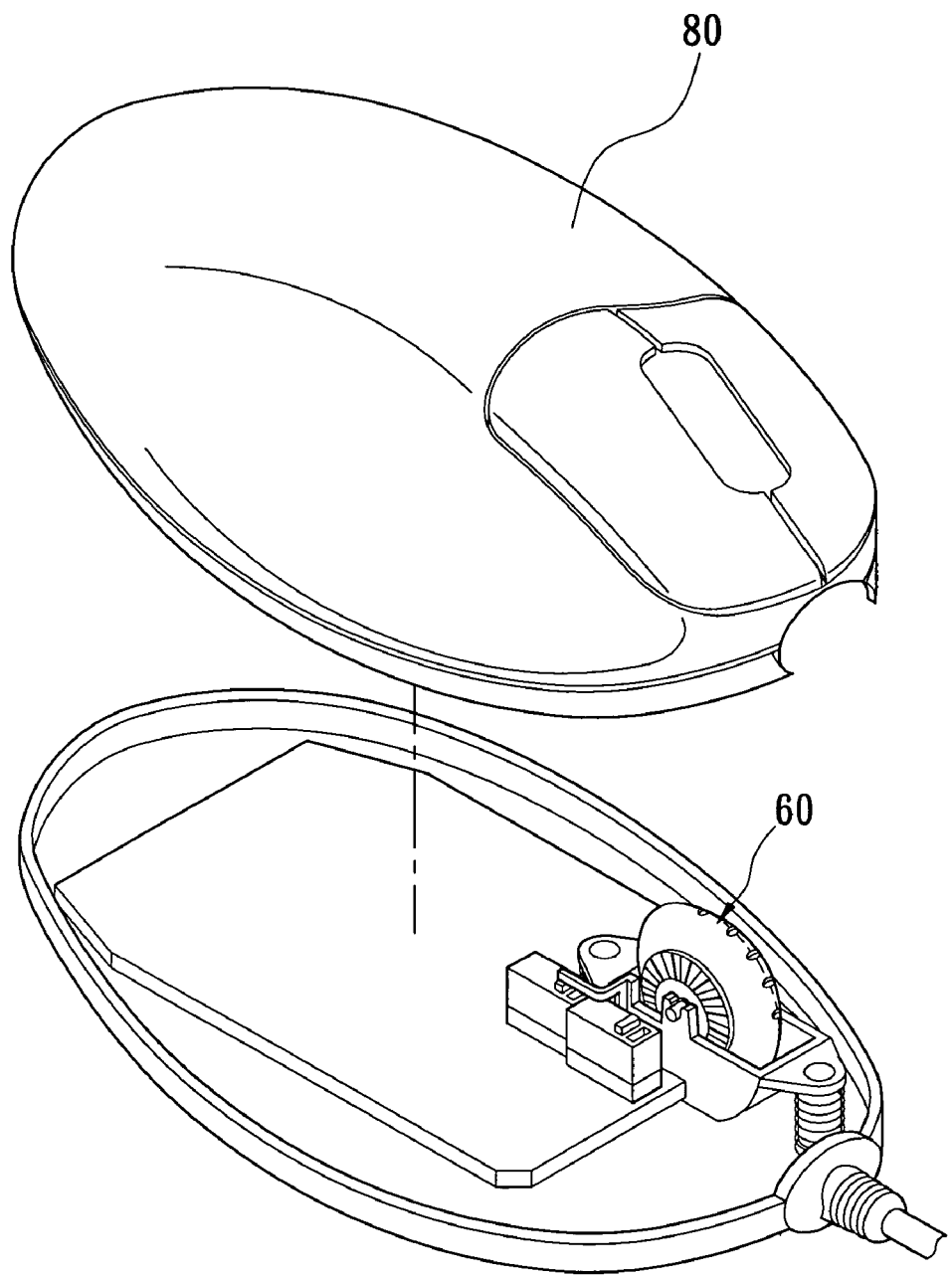
FIG. 1 illustrates a third axis input device installed in the bottom board of a mouse according to the prior art.
Figure 2:
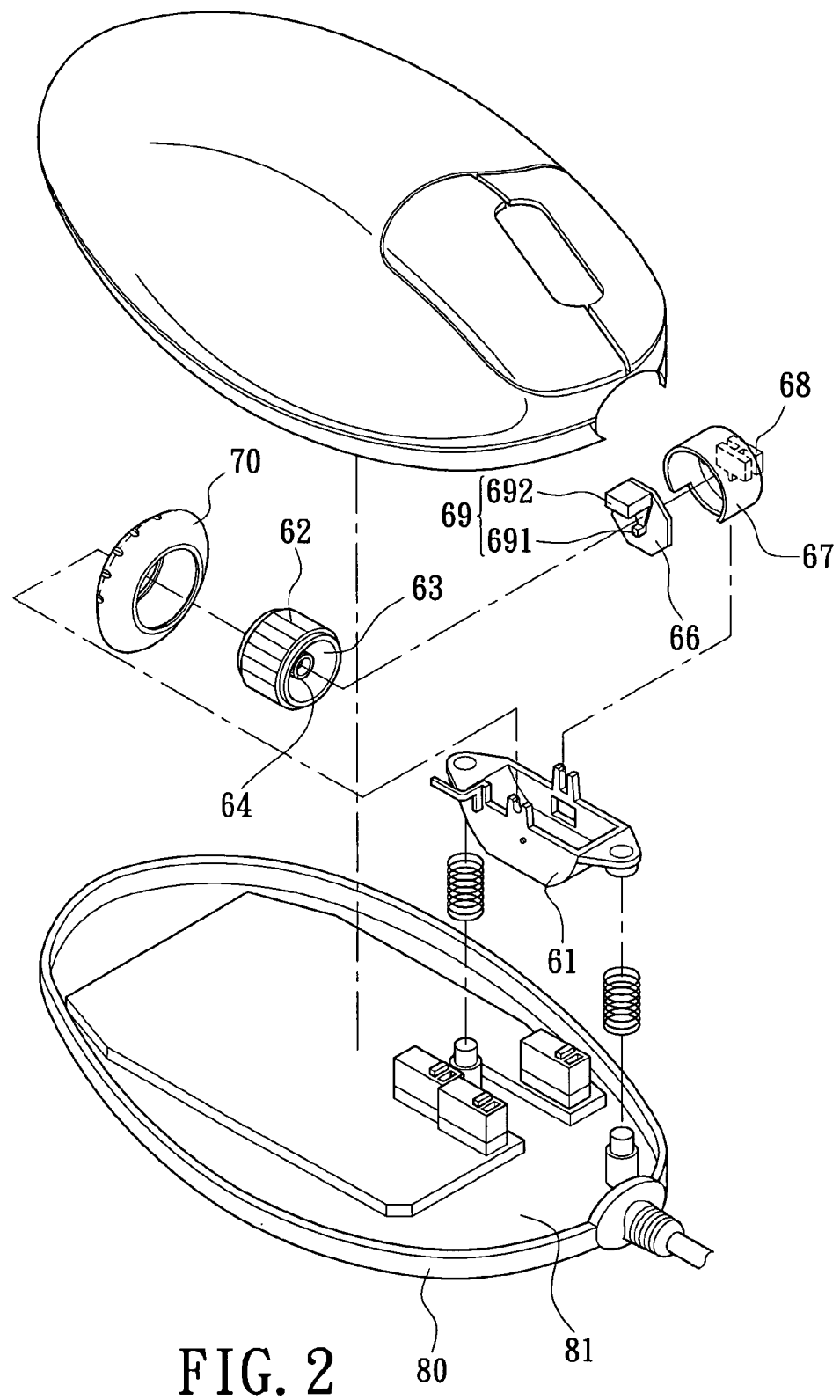
FIG. 2 is an exploded view of the third axis input device shown in FIG. 1.
Figure 3:
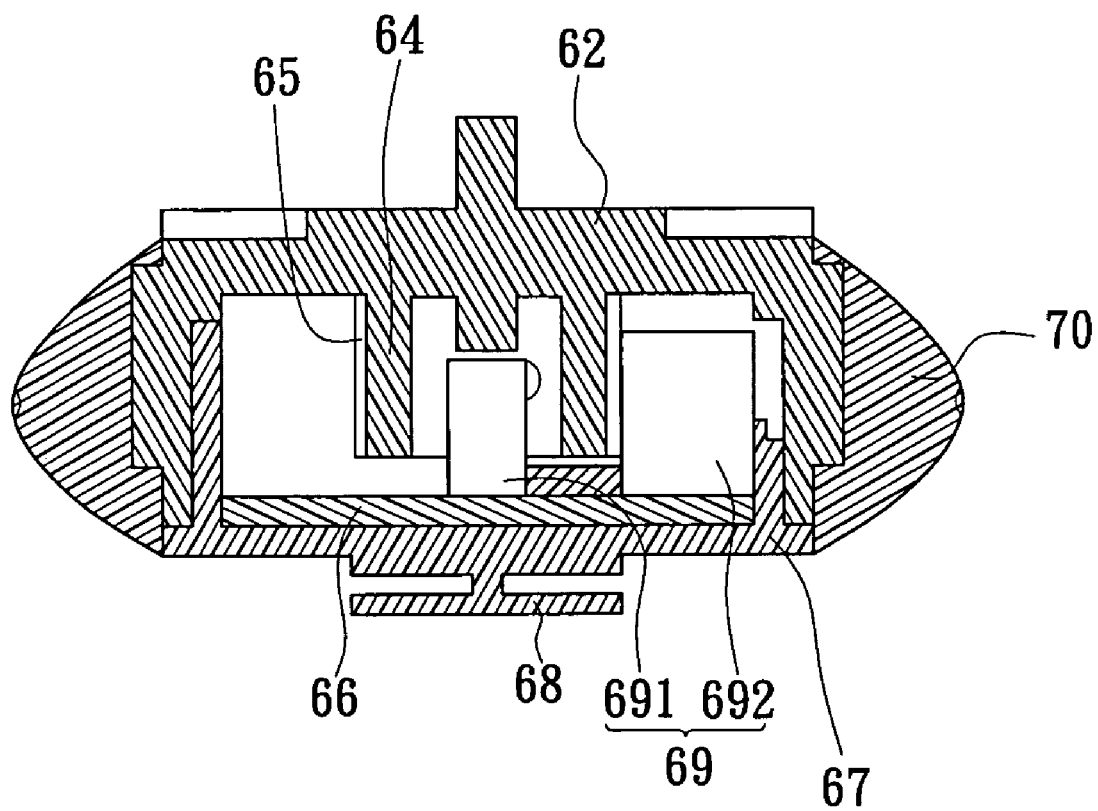
FIG. 3 is a cross-sectional view of the third axis input device shown in FIG. 1.
Figure 4:
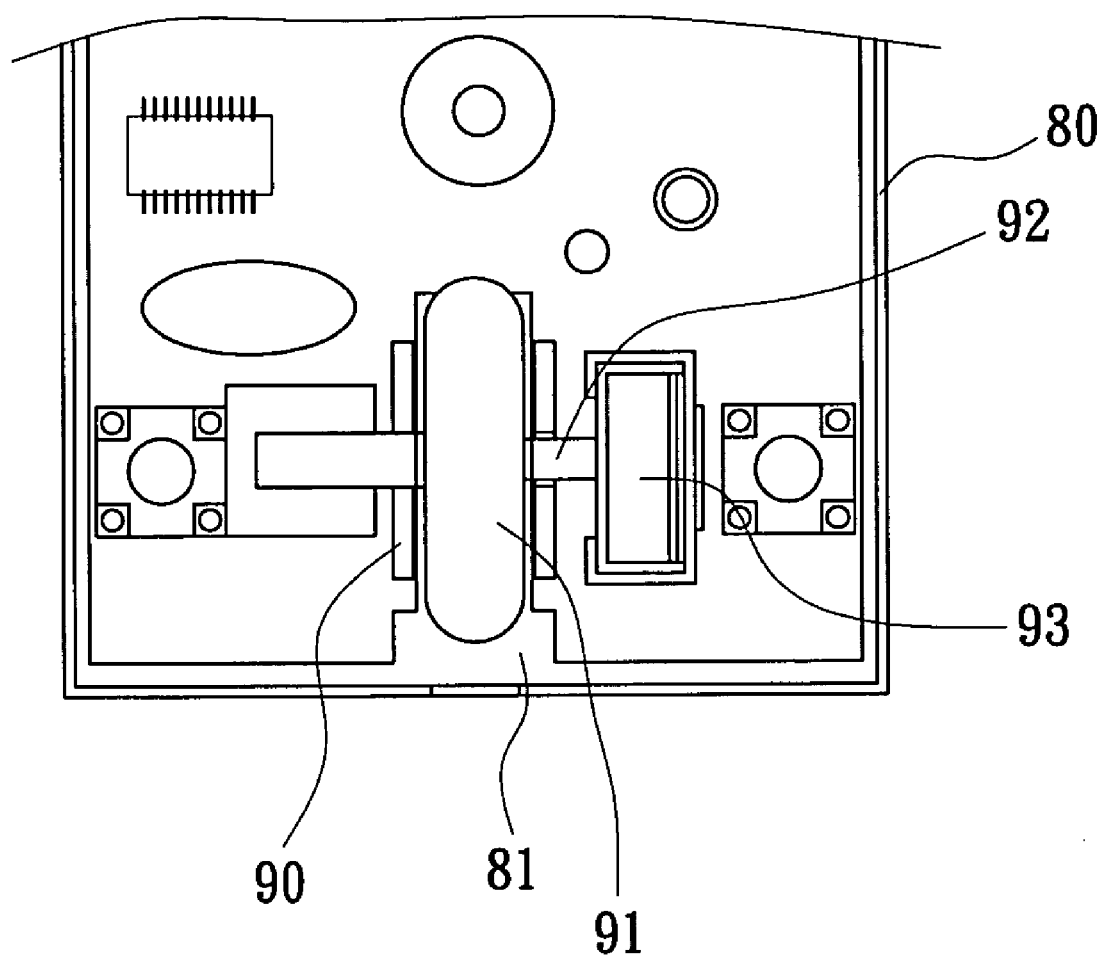
FIG. 4 is a schematic top view showing another design of the third axis input device installed in the bottom board of a mouse according to the prior art.
Figure 5:
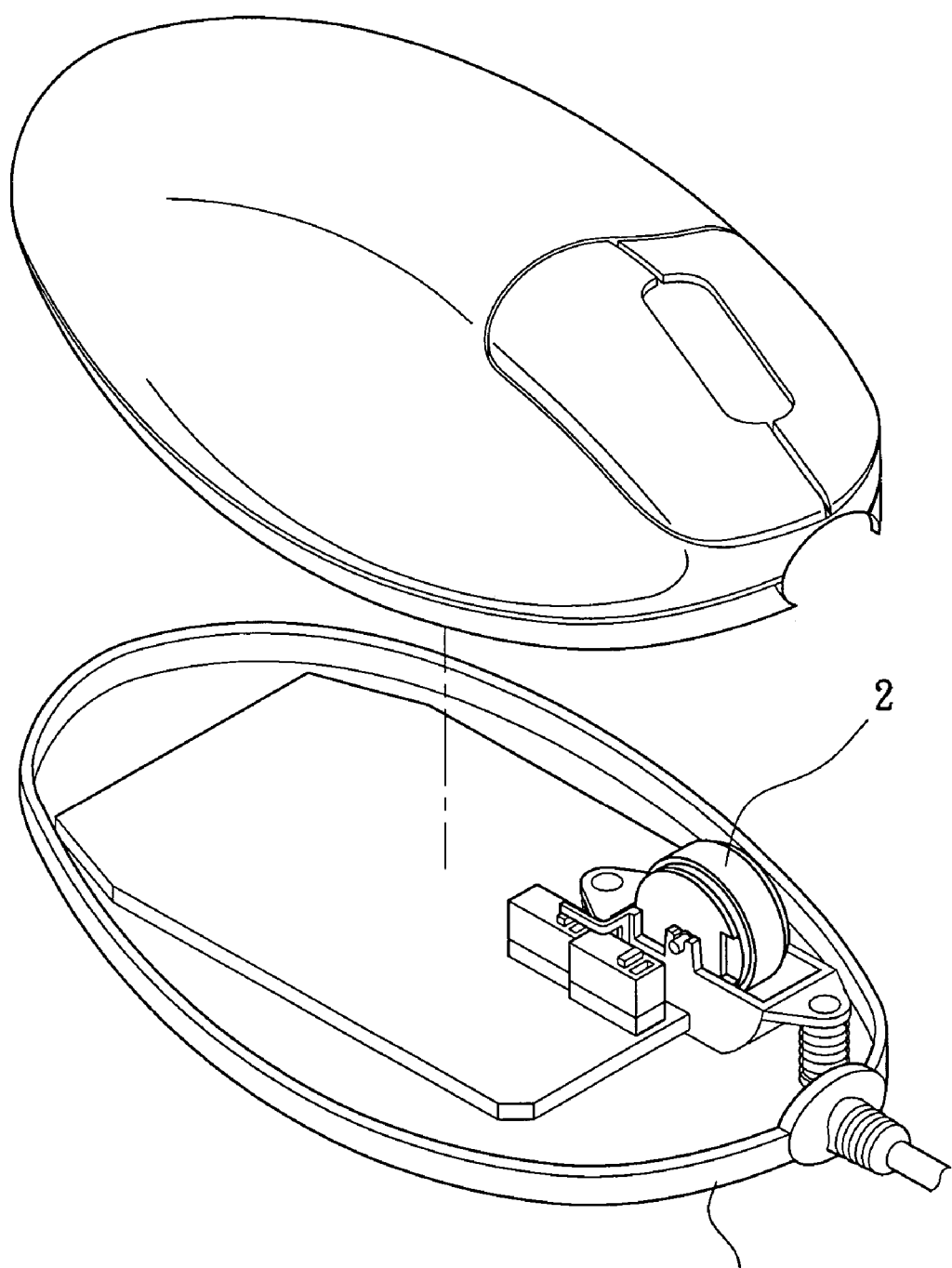
FIG. 5 illustrates a third axis input device installed in the bottom board of a mouse according to the first embodiment of the present invention.
Figure 6:
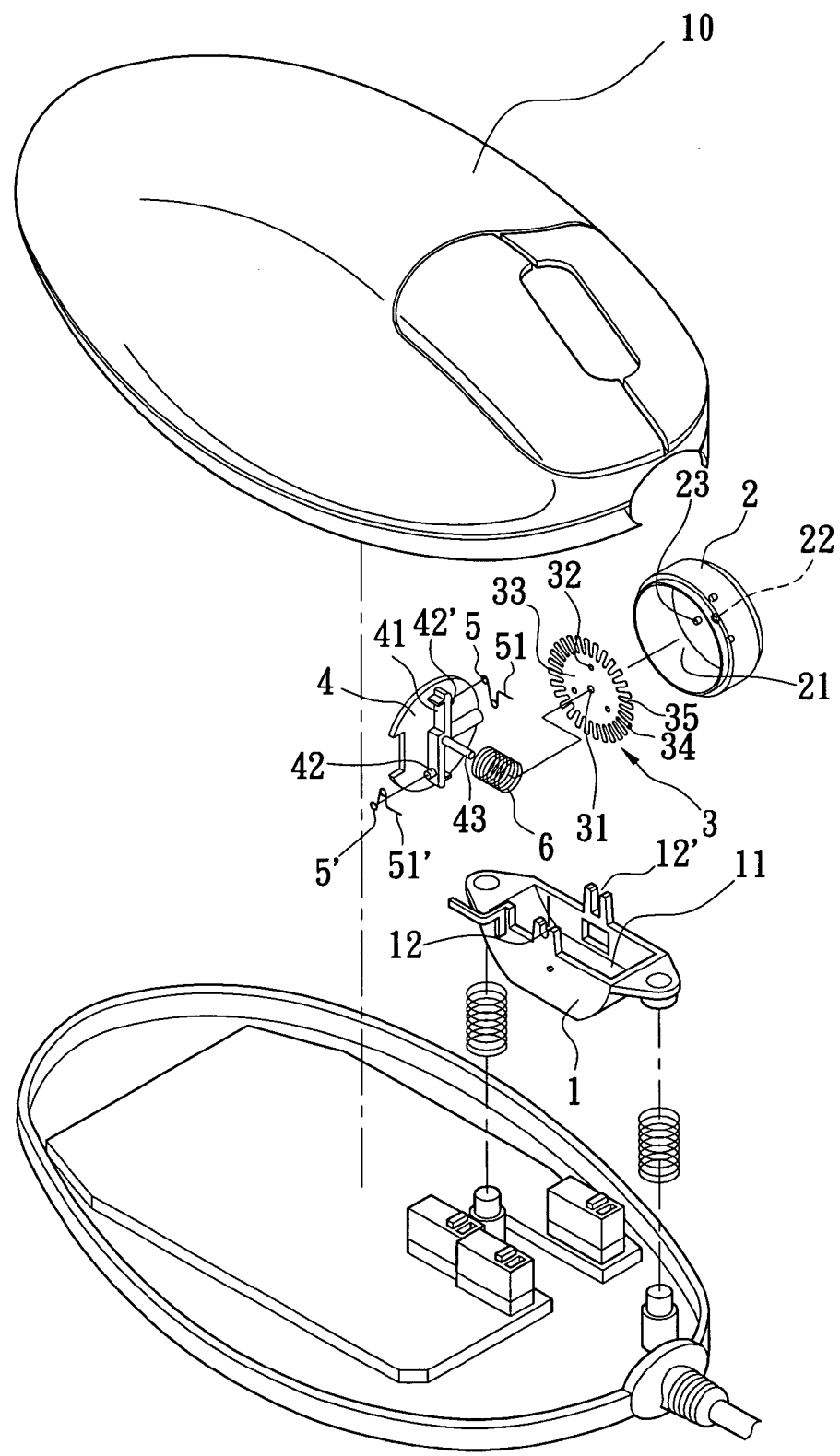
FIG. 6 is an exploded view of the third axis input device according to the first embodiment of the present invention.
Figure 7:
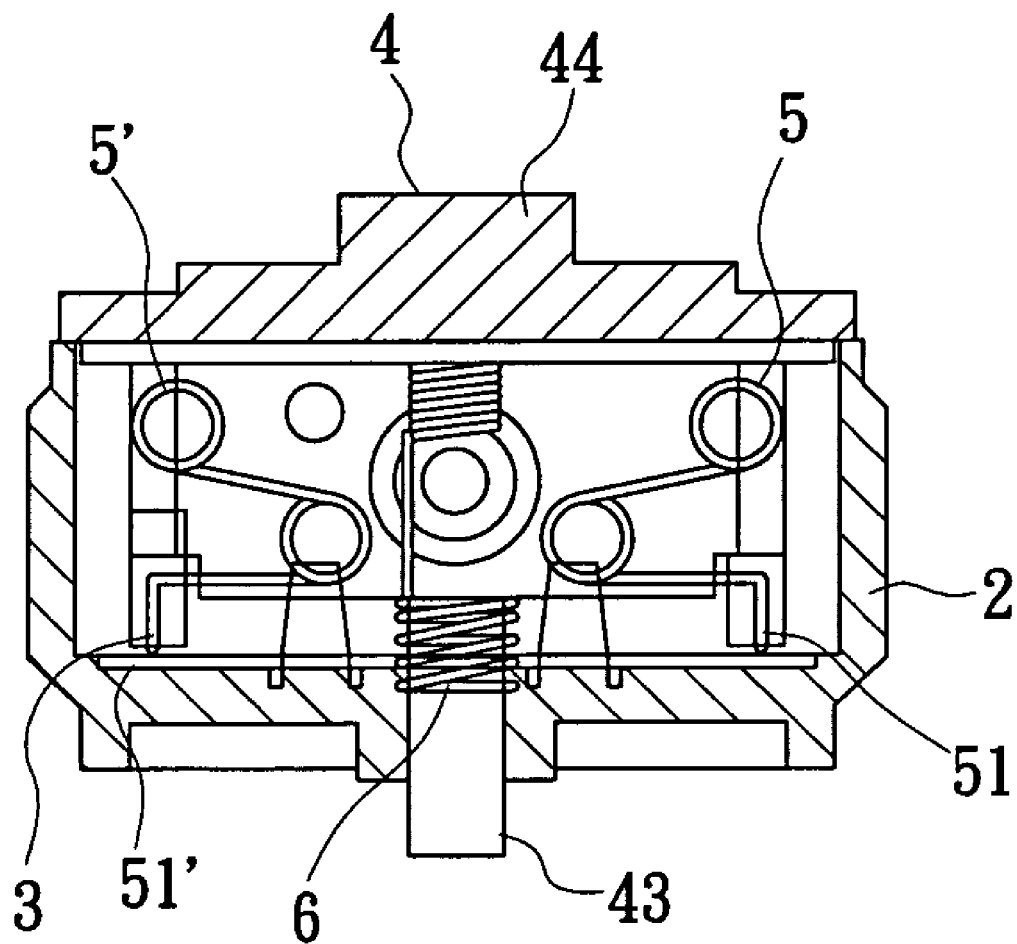
FIG. 7 is a cross-sectional top plain view of the third axis input device according to the first embodiment of the present invention.

Referring to FIGS. 5–7, a third axis input device in accordance with the first embodiment of the present invention is shown installed in a mouse 10. The third axis input device comprises a wheel holder 1, a roller 2, an encoding wheel 3, a locating plate 4, two probes 5, and a spring member 6.

The wheel holder 1 is a hollow casing provided at the bottom board of the mouse 10, having a through hole 11 and two slots 12 and 12' at two sides of the through hole 11.

The flat roller 2 is rotatably mounted in the through hole 11. The outer side of the roller 2 is a closed side. The closed side of the roller 2 is provided with a center axle hole 22 and three pins 23. The three pins 23 are perpendicularly extending from the inner surface of the closed side of the roller 2, and equiangularly spaced around the axle hole 22. The inner side of the roller 2 is provided with a receiving open chamber 21.

The encoding wheel 3 is disposed inside the receiving open chamber 21, having a flat circular wheel body 33, a center through hole 31 extending through the center of the flat circular wheel body 33 and aimed at the center axle hole 22 of the roller 2, and three pin holes 32 extending through the flat circular wheel body 33 around the center through hole 31 and respectively press-fitted onto the pins 23 of the roller 2, a plurality of radial teeth 34 equiangularly spaced around the periphery of the flat circular wheel body 33, and a plurality of peripheral notches 35 equiangularly spaced around the periphery of the flat circular wheel body 33 and equally separated from one another by the radial teeth 34.

The locating plate 4 comprises a protruding mounting portion 44 projecting from the center of the outer side thereof and fastened to one slot 12 of the wheel holder 1, a partition flange 41 disposed at the inner side thereof, two locating pins 42 and 42' provided at two sides of the partition flange 41, an axle 43 perpendicularly extending from the center of the inner side and inserted through the center through hole 31 of the encoding wheel 3 into the center axle hole 22 of the roller 2 and then the other slot 12. The spring member 6 is sleeved onto the axle 43 and stopped between the flat circular wheel body 33 of the encoding wheel 3 and the locating plate 4. Therefore, the locating plate 4 and the roller 2 are pivoted to the slots 12 and 12' of the wheel holder 1, and the second spring member 6 is maintained in contact with the encoding wheel 3.

The spring member 6 is a common pole metal spring member. The probes 5 and 5' can be metal spring strips or metal torsional springs. According to this embodiment, the probes 5 and 5' are metal torsional springs respectively mounted on the locating pins 42 and 42' of the locating plate 4, each having a front contact end 51 or 51' disposed in contact with the periphery of the encoding wheel 3.

Figure 8:
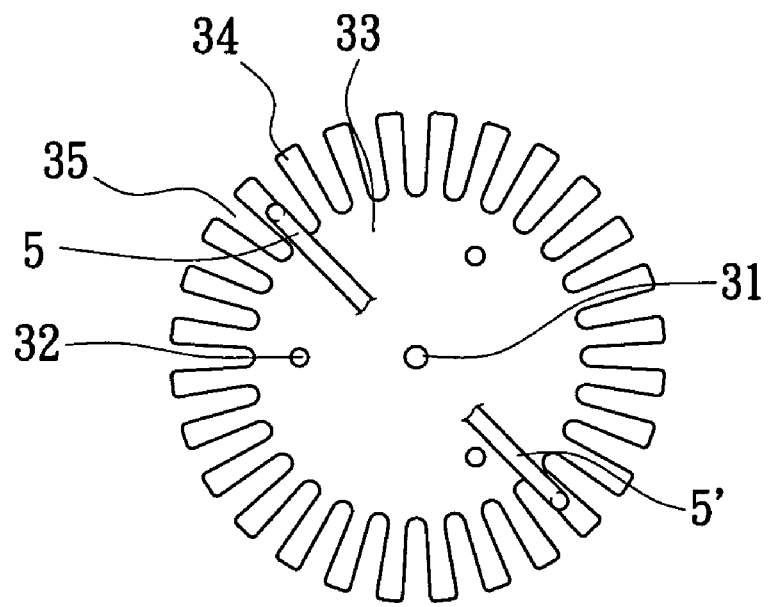
FIG. 8 is a schematic drawing showing the action of the encoding wheel of the mechanical encoder module of the third axis input device according to the first embodiment of the present invention (I)

When receiving electricity from the spring member 6, the rotary motion of the roller 2 is caused to rotate. During rotary motion of the roller 2, the front contact ends 51 and 51' of the probes 5 and 5' are continuously alternatively touching the radial teeth 34 or peripheral notches 35 of the encoding wheel 3 to produce signals subject to the following conditions:

When the front contact ends 51 and 51' of the probes 5 and 5' commonly touch the radial teeth 34, an output signal (1,1) is produced as shown in FIG. 8.

Figure 9:
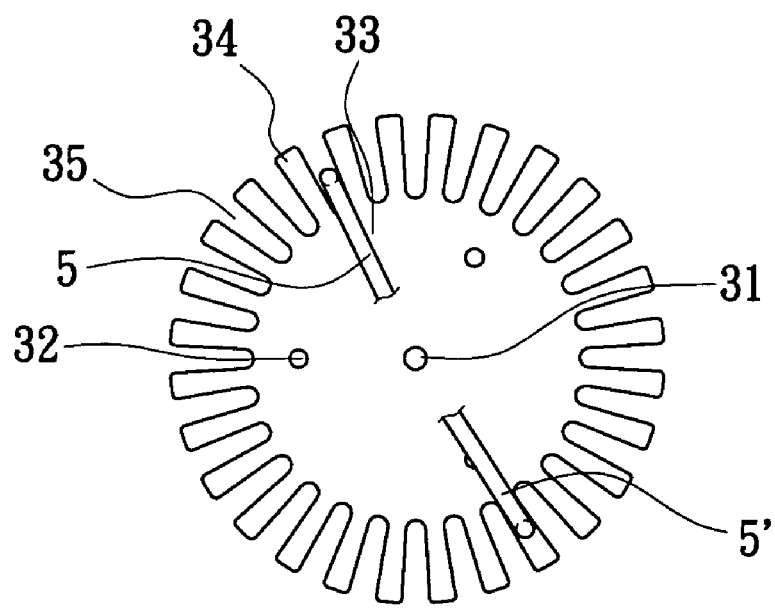
FIG. 9 is a schematic drawing showing the action of the encoding wheel of the mechanical encoder module of the third axis input device according to the first embodiment of the present invention (II)

When the front contact ends 51 and 51' of the probes 5 and 5' respectively touch one peripheral notch 35 and one radial tooth 34, an output signal (0,1) is produced as shown in FIG. 9.

Figure 10:
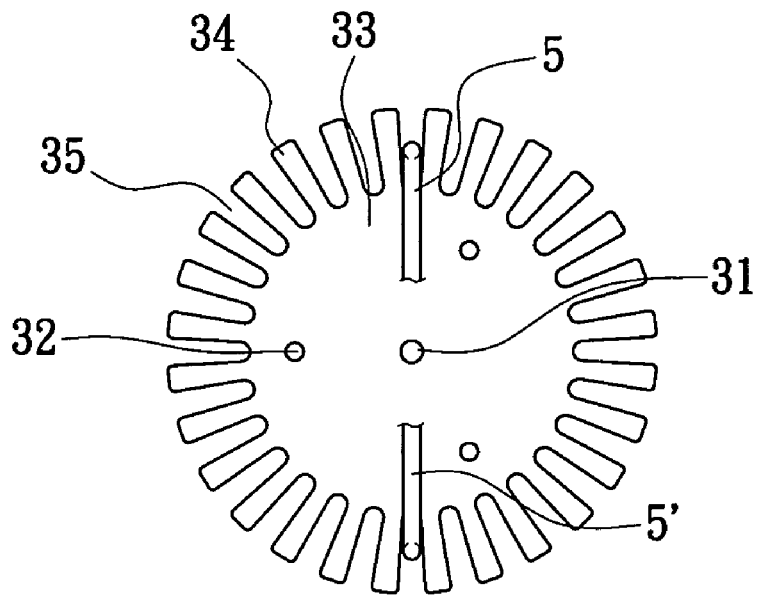
FIG. 10 is a schematic drawing showing the action of the encoding wheel of the mechanical encoder module of the third axis input device according to the first embodiment of the present invention (III)

When the front contact ends 51 and 51' of the probes 5 and 5' commonly touch the peripheral notches 35, an output signal (0,0) is produced as shown in FIG. 10.

Figure 11:
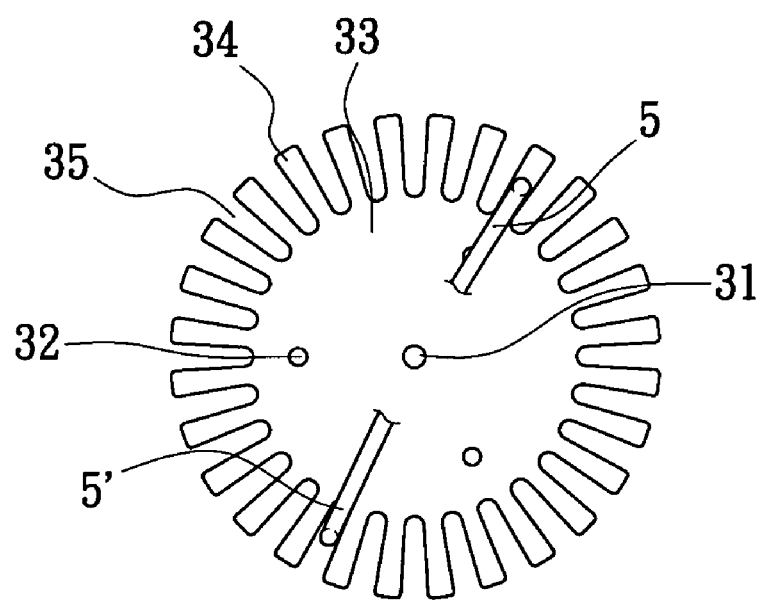
FIG. 11 is a schematic drawing showing the action of the encoding wheel of the mechanical encoder module of the third axis input device according to the first embodiment of the present invention (IV)

When the front contact ends 51 and 51' of the probes 5 and 5' respectively touch one radial tooth 34 and one peripheral notch 35, an output signal (1,0) is produced as shown in FIG. 11.

During clockwise rotation of the roller 2, the third axis input device outputs the aforesaid four signals repeatedly in proper order. During counter-clockwise rotation of the roller 2, the third axis input device outputs the aforesaid four digital signals repeatedly in the reversed order. Therefore, the posterior circuit of the mouse gives a signal to the computer indicative of the angle and amount of movement of the roller 2.

Alternatively, the probes 5 and 5' can be arranged to output signals (1,1), (1,0), and (0,0).

Figure 12:
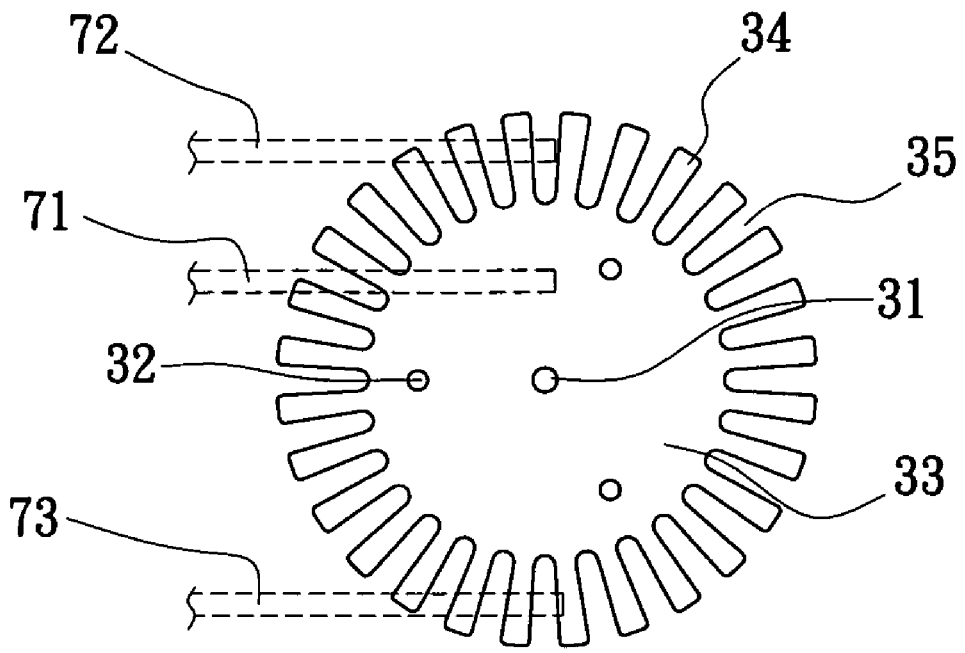
FIG. 12 is a schematic drawing showing the action of the encoding wheel of the mechanical encoder module of a third axis input device according to the second embodiment of the present invention (I)
Figure 13:
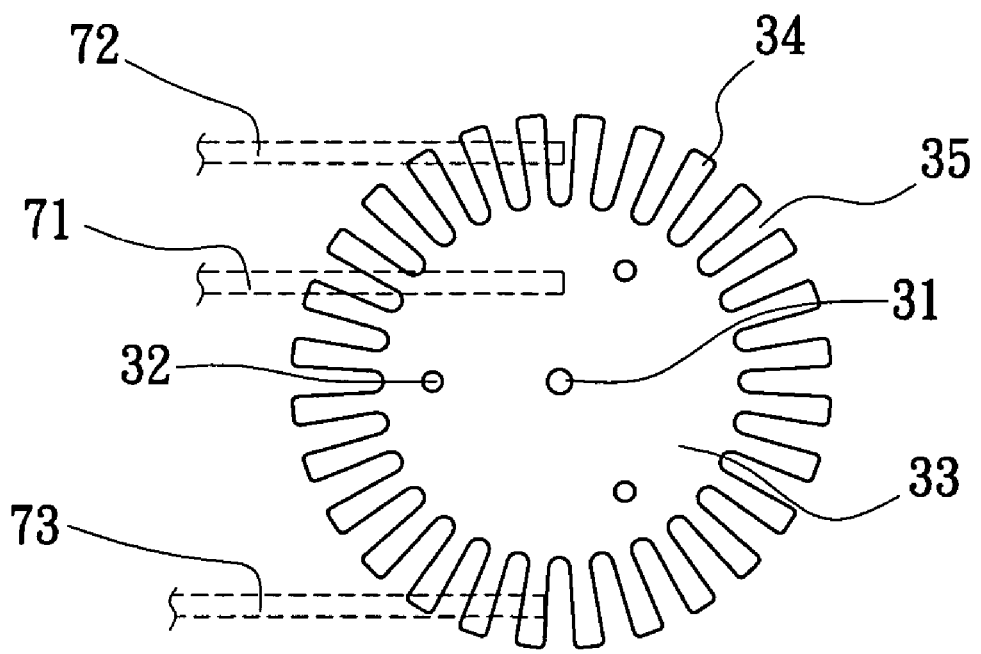
FIG. 13 is a schematic drawing showing the action of the encoding wheel of the mechanical encoder module of a third axis input device according to the second embodiment of the present invention (II)
Figure 14:
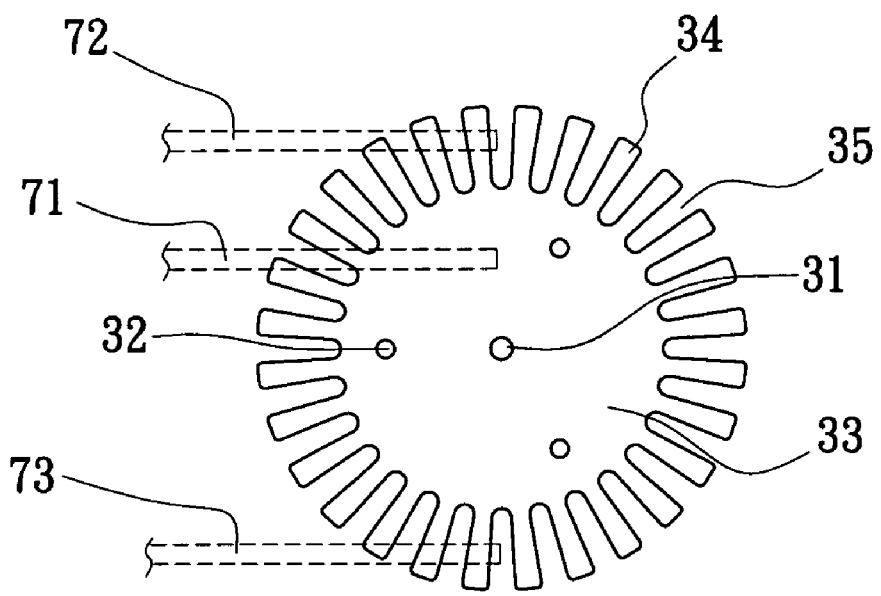
FIG. 14 is a schematic drawing showing the action of the encoding wheel of the mechanical encoder module of a third axis input device according to the second embodiment of the present invention (III)

FIGS. 12–14 are schematic drawings showing the action of the encoding wheel of the mechanical encoder module of a third axis input device according to the second embodiment of the present invention. According to this embodiment, the probes 72 and 73 are metal spring strips. When the roller 2 receives electricity from the metal conductor member 71 and starts to rotate, the probes 72 and 73 are forced to continuously and alternatingly touch the radial teeth 34 or peripheral notches 35 of the encoding wheel 3 and to further produce signals subject to the following conditions:

When the probes 72 and 73 commonly touch the radial teeth 34, an output signal (1,1) is produced as shown in FIG. 12.

When the probes 72 and 73 respectively touch one peripheral notch 35 and one radial tooth 34, an output signal (0,1) is produced as shown in FIG. 13.

When the probes 72 and 73 commonly touch the peripheral notches 35, an output signal (0,0) is produced as shown in FIG. 14.

Figure 15:
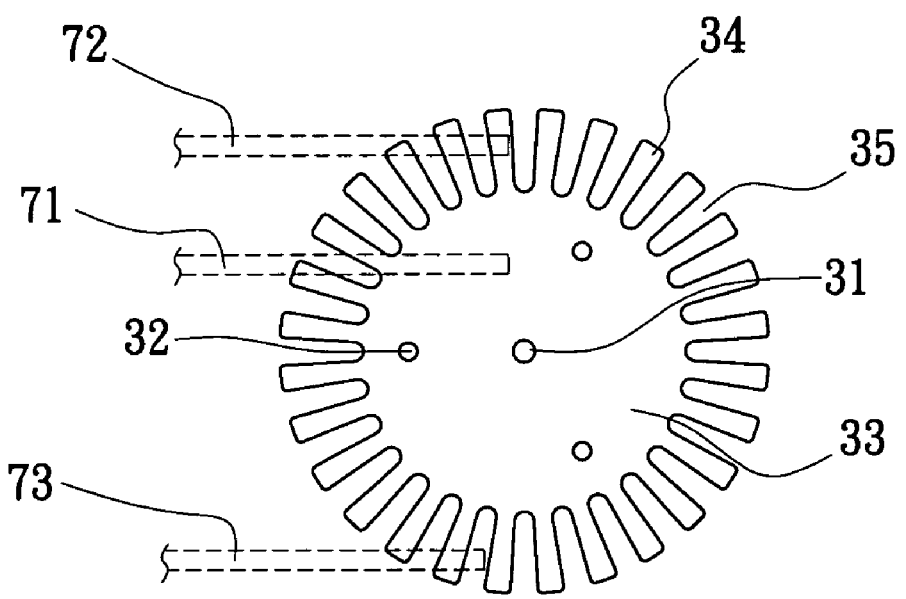
FIG. 15 is a schematic drawing showing the action of the encoding wheel of the mechanical encoder module of a third axis input device according to the second embodiment of the present invention (IV)

When the probes 72 and 73 respectively touch one radial tooth 34 and one peripheral notch 35, an output signal (1,0) is produced as shown in FIG. 15.

Alternatively, the probes 72 and 73 can be arranged to output signals (1,1), (1,0), and (0,0).

Figure 16:
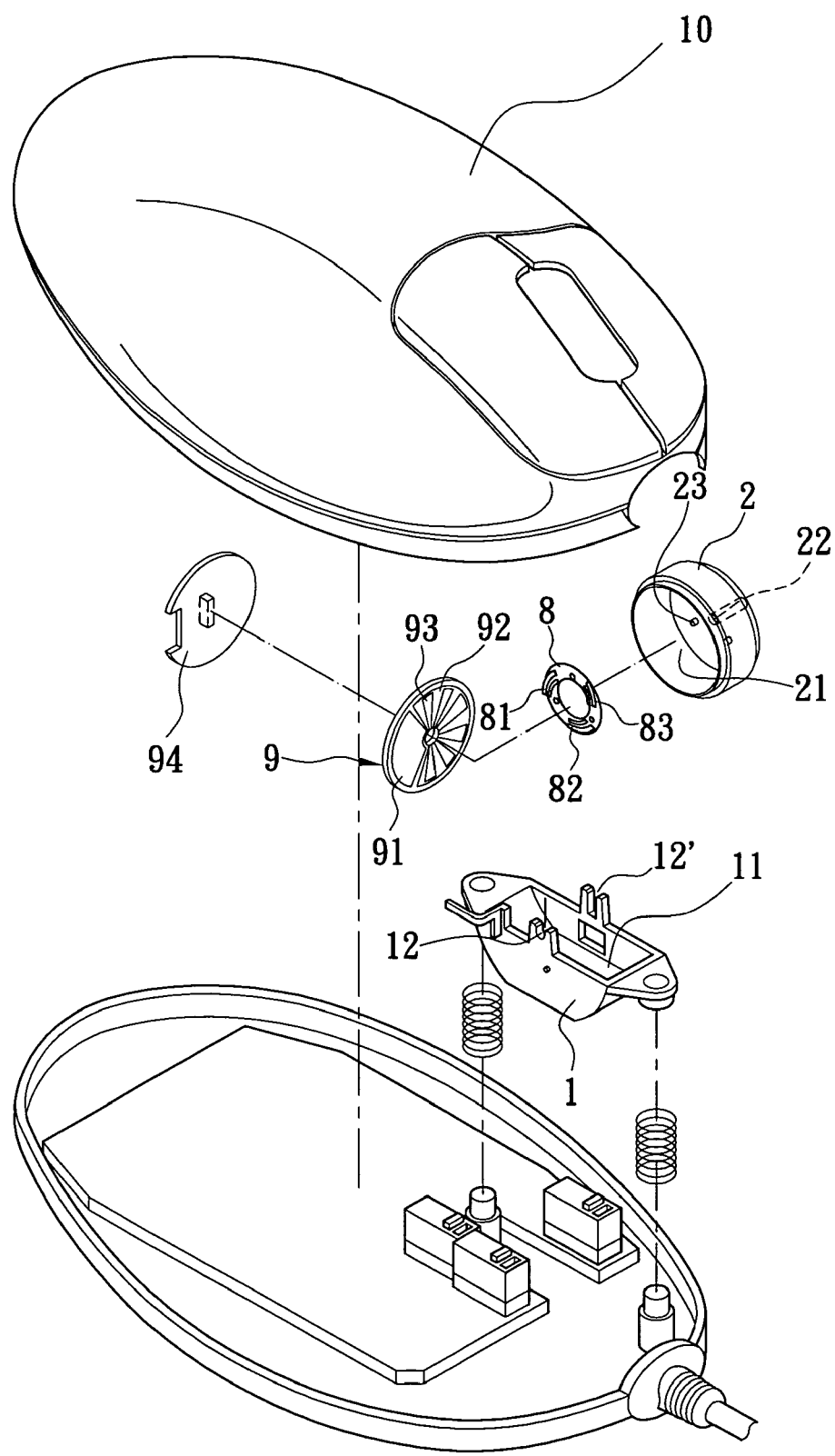
FIG. 16 is an exploded view of the third axis input device according to the third embodiment of the present invention.

FIG. 16 is an exploded view of the third axis input device according to the third embodiment of the present invention. According to this embodiment, the third axis input device is mounted inside a mouse 10, comprising a wheel holder 1, a flat roller 2, a probe wheel 8 mounted in the receiving open chamber 21 of the roller 2 and holding three equiangularly spaced probes 81, 82, and 83 at one side, an encoding circuit board 9, and a cover plate 94 fastened to the roller 2 to hold the encoding circuit board 9 inside the receiving open chamber 21 in contact with the probes 81, 82, and 83. The roller 2, the probe wheel 8, the encoding circuit board 9 and the cover plate 94 are fastened together and inserted into the through hole 11 and pivoted to the slots 12 and 12' of the wheel holder 1. The encoding circuit board 9 comprises a common contact portion 91, a conducting portion 92, and an electrically insulative portion 93 respectively disposed in contact with the probes 81, 82, and 83. The common contact portion 91 and the conducting portion 92 can be sealed on the surface of the substrate of the encoding circuit board 9 by a press or glue. Alternatively, the common contact portion 91 and the conducting portion 92 can be directly printed on the encoding circuit board 9. During rotary motion of the roller 2, different signals (1,1), (1,0), (0,0), (0,1) are produced subject to the direction and amount of rotation of the roller 2.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A third axis input device used in a mouse, comprising:
   a wheel holder mounted on a bottom board inside said mouse;
   a roller, said roller having a closed outer side, an inner side, and a receiving open chamber in said inner side;
   an encoding wheel mounted inside said roller and pivoted with said roller to said wheel holder, said encoding wheel having a mechanical tooth form; and
   a locating plate coupled to the inner side of said roller for enabling said roller to be pivoted with said encoding wheel to said wheel holder, said locating plate holding a plurality of probes respectively disposed in contact with the tooth form of said encoding wheel and adapted to output a signal indicative of direction and amount of rotation of said encoding wheel and said roller;
   wherein said roller has a center axle hole and a plurality of pins equiangularly spaced around said center axle hole for securing said encoding wheel.

2. The third axis input device as claimed in claim 1, wherein said encoding wheel has a center through hole and a plurality of pin holes equiangularly spaced around said center through hole and respectively press-fitted onto the pins of said roller.

3. The third axis input device as claimed in claim 1, wherein said encoding wheel comprises a flat circular wheel body, a plurality of radial teeth equiangularly spaced around the periphery of said flat circular wheel body, and a plurality of peripheral notches equiangularly spaced around the periphery of said flat circular wheel body and equally separated from one another by said radial teeth.

4. A third axis input device used in a mouse, comprising:
   a wheel holder mounted on a bottom board inside said mouse;
   a roller, said roller having a closed outer side, an inner side, and a receiving open chamber in said inner side;
   an encoding wheel mounted inside said roller and pivoted with said roller to said wheel holder, said encoding wheel having a mechanical tooth form; and
   a locating plate coupled to the inner side of said roller for enabling said roller to be pivoted with said encoding wheel to said wheel holder, said locating plate holding a plurality of probes respectively disposed in contact with the tooth form of said encoding wheel and adapted to output a signal indicative of direction and amount of rotation of said encoding wheel and said roller;
   wherein said locating plate comprises a partition flange disposed at an inner side thereof, two locating pins provided at two sides of said partition flange and adapted to hold said probes, an axle perpendicularly extending from the center of the inner side and adapted to pivot said encoding wheel and said roller to said wheel holder.

5. The third axis input device as claimed in claim 1, wherein said probes are respectively formed of metal spring members.

6. The third axis input device as claimed in claim 1, wherein said probes are respectively formed of metal conductor members.

7. The third axis input device as claimed in claim 1, wherein the number of said probes is at least 3.

8. A third axis input device used in a mouse, comprising:
   a wheel holder mounted on a bottom board inside said mouse;
   a roller, said roller having an outer closed side, and a receiving open chamber in an inner side thereof;
   an encoding wheel disposed inside said receiving open chamber of said roller, said encoding wheel comprising a flat circular wheel body, a plurality of radial teeth equiangularly spaced around the periphery of said flat circular wheel body, and a plurality of peripheral notches equiangularly spaced around the periphery of said flat circular wheel body and equally separated from one another by said radial teeth;
   a locating plate coupled to the inner side of said roller to pivot said roller and said encoding wheel to said wheel holder; and
   a plurality of probes respectively mounted on one side of said locating plate, disposed in contact with the radial teeth and peripheral notches of said encoding wheel and adapted to output a signal indicative of direction and amount of rotation of said encoding wheel and said roller;
   wherein said roller has a center axle hole and a plurality of pins equiangularly spaced around said center axle hole for securing said encoding wheel.

9. The third axis input device as claimed in claim 8, wherein said encoding wheel has a center through hole and a plurality of pin holes equiangularly spaced around said center through hole and respectively press-fitted onto the pins of said roller.

10. A third axis input device 9 used in a mouse, comprising:
    a wheel holder mounted on a bottom board inside said mouse;

a roller, said roller having an outer closed side, and a receiving open chamber in an inner side thereof;

an encoding wheel disposed inside said receiving open chamber of said roller, said encoding wheel comprising a flat circular wheel body, a plurality of radial teeth equiangularly spaced around the periphery of said flat circular wheel body, and a plurality of peripheral notches equiangularly spaced around the periphery of said flat circular wheel body and equally separated from one another by said radial teeth;

a locating plate coupled to the inner side of said roller to pivot said roller and said encoding wheel to said wheel holder; and a plurality of probes respectively mounted on one side of said locating plate, disposed in contact with the radial teeth and peripheral notches of said encoding wheel and adapted to output a signal indicative of direction and amount of rotation of said encoding wheel and said roller;

wherein said locating plate comprises a partition flange disposed at an inner side thereof, two locating pins provided at two sides of said partition flange and adapted to hold said probes, an axle perpendicularly extending from the center of the inner side and adapted to pivot said encoding wheel and said roller to said wheel holder.

11. The third axis input device as claimed in claim 8, wherein said locating plate comprises a retaining flange protruding from an outer side thereof and fastened to said wheel holder.

12. The third axis input device as claimed in claim 8, wherein said probes are respectively formed of metal spring members.

13. The third axis input device as claimed in claim 8, wherein said probes are metal conductor members.

14. The third axis input device as claimed in claim 8, wherein a number of said probes is at least 3.

15. A third axis input device used in a mouse, comprising:

a wheel holder mounted on a bottom board inside said mouse;

a roller, said roller having an outer closed side and a receiving open chamber in an inner side thereof;

at least one probe wheel, said at least one probe wheel each having a plurality of probes; and a locating plate coupled to the inner side of said roller to pivot said roller and said at least one probe wheel to said wheel holder, said locating plate holding a fixed encoding wheel in contact with the probes of said probe wheel for outputting a signal indicated of the direction and amount of rotation of said roller and said at least one probe wheel relative to said wheel holder;

wherein said roller comprises a center axle hole, and a plurality of pins equiangularly spaced around said center axle hole and adapted to hold said at least one probe wheel.

16. The third axis input device as claimed in claim 15, wherein said probes are respectively formed integral with said at least one probe wheel.

17. The third axis input device as claimed in claim 15, wherein a number of probes of each said probe wheel is at least 3.

18. The third axis input device as claimed in claim 15, wherein said encoding wheel comprises a common contact portion, a conducting portion, and an electrically insulative portion respectively disposed in contact with the probes of each said probe wheel.

19. The third axis input device as claimed in claim 15, wherein said encoding wheel is formed of a circuit board and a cover plate.

* * * * *